(12) United States Patent
Jing et al.

(10) Patent No.: US 9,683,765 B2
(45) Date of Patent: Jun. 20, 2017

(54) ELECTRIC VALVE AND REFRIGERATING SYSTEM COMPRISING THE SAME

(71) Applicant: HEFEI MEILING CO., LTD, Hefei, Anhui (CN)

(72) Inventors: Song Jing, Hefei (CN); Bangfu Wei, Hefei (CN); Yongshou Huang, Hefei (CN); Shoutao Jia, Hefei (CN); Qingsong Li, Hefei (CN)

(73) Assignee: HEFEI MEILING CO., LTD, Hefei Anhui (CN)

( * ) Notice: Subject to any disclaimer, the term of this patent is extended or adjusted under 35 U.S.C. 154(b) by 289 days.

(21) Appl. No.: 14/428,367

(22) PCT Filed: Nov. 8, 2012

(86) PCT No.: PCT/CN2012/001505
§ 371 (c)(1),
(2) Date: Mar. 14, 2015

(87) PCT Pub. No.: WO2014/040212
PCT Pub. Date: Mar. 20, 2014

(65) Prior Publication Data
US 2015/0226470 A1     Aug. 13, 2015

(30) Foreign Application Priority Data

Sep. 16, 2012  (CN) .......................... 2012 1 0341884
Sep. 16, 2012  (CN) .......................... 2012 1 0341897
(Continued)

(51) Int. Cl.
F25B 41/04     (2006.01)
F25B 5/02      (2006.01)
(Continued)

(52) U.S. Cl.
CPC ............ *F25B 41/04* (2013.01); *F16K 11/074* (2013.01); *F16K 11/0743* (2013.01);
(Continued)

(58) Field of Classification Search
CPC .. F25B 5/00; F25B 41/067; F25B 2341/0661; F16K 11/074; F16K 31/041; F16K 11/0743; Y10T 137/86638
See application file for complete search history.

(56) References Cited

U.S. PATENT DOCUMENTS 5,361,796 A      11/1994  Mutter
6,591,619 B2 *   7/2003   Kaneko ................. F16K 11/074
                                                          137/625.31
(Continued)

FOREIGN PATENT DOCUMENTS

CN     1289033 A     3/2001
CN     1334417 A     2/2002
(Continued)

OTHER PUBLICATIONS

International Search Report for PCT/CN2012/001505 dated Jun. 27, 2013.
(Continued)

*Primary Examiner* — Emmanuel Duke
(74) *Attorney, Agent, or Firm* — Nixon Peabody LLP (57) ABSTRACT

Electric valve and a refrigerating system. An inlet, a pressure relief port and a plurality of outlets are set on a valve seat of the electric valve; a valve cap is covered above the valve seat; an electric motor is fixedly set on the valve cap, a stator of the electric motor is set on the outer surface of the valve cap, and a rotor is set in the intracavity of the valve cap; the lower end of a mandrel is fixedly provided with a valve core that is opened with a pressure-relief diversion slot and a through slot, wherein the pressure-relief diversion slot is
(Continued)

opened on the lower surface of the valve core, the through slot penetrates through the valve core along the thickness direction of the valve core. Refrigerant bifurcation, cutoff, pressure relief, etc., in refrigerating system is realized by rotating the valve core to different positions.

18 Claims, 11 Drawing Sheets

(30) Foreign Application Priority Data

Sep. 16, 2012 (CN) .......................... 2012 1 0342043
Sep. 16, 2012 (CN) .......................... 2012 1 0342662

(51) Int. Cl.
    *F16K 11/074*     (2006.01)
    *F16K 31/04*     (2006.01)
    *F25B 41/06*     (2006.01)
    *F25B 5/00*     (2006.01)

(52) U.S. Cl.
    CPC .............. *F16K 31/041* (2013.01); *F25B 5/00* (2013.01); *F25B 5/02* (2013.01); *F25B 41/067* (2013.01); *F25B 2341/0661* (2013.01); *F25B 2600/2507* (2013.01); *Y10T 137/86622* (2015.04); *Y10T 137/86638* (2015.04)

(56) References Cited

U.S. PATENT DOCUMENTS

| | | | |
|---|---|---|---|
| 8,091,380 B2 * | 1/2012 | Chen | ..................... F16K 11/074 62/118 |
| 2008/0116410 A1 | 5/2008 | Jeong et al. | |
| 2010/0000244 A1 | 1/2010 | Kawakatsu et al. | |

FOREIGN PATENT DOCUMENTS

| | | | |
|---|---|---|---|
| CN | 1388876 | A | 1/2003 |
| CN | 1515851 | A | 7/2004 |
| CN | 2811876 | Y | 8/2006 |
| CN | 101230928 | A | 7/2008 |
| CN | 101275678 | A | 10/2008 |
| CN | 201476393 | U | 5/2010 |
| CN | 101839356 | A | 9/2010 |
| CN | 102037294 | A | 4/2011 |
| CN | 202066260 | U | 12/2011 |
| CN | 202119169 | U | 1/2012 |
| CN | 102818391 | A | 12/2012 |
| CN | 202812309 | U | 3/2013 |
| CN | 202813864 | U | 3/2013 |
| CN | 202813915 | U | 3/2013 |
| CN | 202813916 | U | 3/2013 |
| JP | 2000-310348 | A | 11/2000 |
| JP | 2000310348 | A * | 11/2000 |
| JP | 2001-141080 | A | 5/2001 |
| JP | 2001-343077 | A | 12/2001 |
| JP | 2001343077 | A * | 12/2001 |
| JP | 2002-005543 | A | 1/2002 |
| JP | 2002-5543 | A | 1/2002 |
| JP | 2002005543 | A * | 1/2002 |
| JP | 2003-65449 | A | 3/2003 |
| WO | 2014/040212 | A1 | 3/2014 |

OTHER PUBLICATIONS

International Preliminary Report on Patentability for PCT/CN2012/001505 dated Sep. 22, 2014.

* cited by examiner

ELECTRIC VALVE AND REFRIGERATING SYSTEM COMPRISING THE SAME

RELATED APPLICATIONS

The present application is the national phase of International Application No. PCT/CN2012/001505, filed on Nov. 8, 2012, which claims the benefit of priority to Chinese Patent Application Nos. 201210342662.8, filed on Sep. 16, 2012, 201210341884.8, filed on Sep. 16, 2012, 201210341897.5, filed on Sep. 16, 2012, and 201210342043.9, filed on Sep. 16, 2012, and the disclosures of which are hereby incorporated herein by reference in their entireties.

FIELD OF THE INVENTION

The present invention relates to an electric valve and a refrigerating system comprising the same.

BACKGROUND OF THE INVENTION

Most of the ordinary domestic refrigerators belong to vapour compression-type refrigerating systems, which realize a control on the temperature in the refrigerators by controlling the on and off of a compressor. However, when the compressor stops working, the pressures in the condenser and the evaporator tend to be balanced, and during the balancing process, the hot-state refrigerant flows into the evaporator via capillary tubes, which causes a part of meaningless energy dissipation to the refrigerator. When the compressor is started, a part of energy will be lost during the process that the condenser and the evaporator reestablish a pressure difference, and the more frequently the refrigerator is turned on and turned off, the more energy will be dissipated. This part of energy dissipation caused by the on and off of the compressor will cause the power consumption of the refrigerator to rise.

Chinese patent application No. 03112681.2, titled "condenser pressure maintaining and energy saving-type refrigerating system for refrigerator" disclose a condenser pressure maintaining and energy saving technology, which closes the outlet of the condenser instantaneously by an electric valve at the time the compressor stops, so that the pressure difference between the condenser and the evaporator is maintained, and the hot-state refrigerant is prevented from flowing into the evaporator to influence the refrigeration effect. When the compressor is started again, the process of reestablishing a pressure difference may be omitted, and the refrigeration of the refrigerator may be realized rapidly. In order to help the compressor to start and lower the pressure in the exhaust pipe, a "pressure relief" loop including a one-way valve further needs to be designed at the inlet position of the condenser for the above "condenser pressure maintaining and energy saving-type refrigerating system for refrigerator". For such a traditional condenser pressure maintaining and energy saving technology, the electric valve used belongs to a "two-position and two-way" bistable pulse solenoid valve, of which the movement switching mode of the valve core is straight line back and forth impulse mode. Such a solenoid valve has a biggest defect of large action noise, and it cannot realize the "pressure relief" function by itself, so that a dedicated "pressure relief capillary tube" with a condensation function needs to be designed specially or a "two-position and two-way" pressure relief solenoid valve needs to be added, thereby problems of "slow response" of the pressure relief loop, poor close performance of the one-way valve, a large number of parts and components and unstable energy saving effect of the refrigerator will be caused.

SUMMARY OF THE INVENTION

To avoid the above defects of the prior art, the present invention provides an electric valve and a refrigerating system comprising the same, thereby a plurality of functions, for example, refrigerant bifurcation, pressure maintaining and pressure relief, may be realized.

The invention employs the following technical solutions to solve the above technical problems.

An electric valve, which includes a valve seat, an electric motor and a valve cap; wherein, an inlet, a pressure relief port and a plurality of outlets are set on the valve seat, the pressure relief port and the outlets being located on the upper surface of the valve seat; the valve cap is covered above the valve seat; the electric motor is fixedly set on the valve cap, and the electric motor includes a stator and a rotor, wherein the stator is set on the outer surface of the valve cap, and the rotor is set in the intracavity of the valve cap; the central part of the rotor is provided with a mandrel, and the rotor may rotate around the axis of the mandrel; the lower end of the mandrel is fixedly provided with a valve core that is opened with a pressure-relief diversion slot and a through slot, and the lower surface of the valve core contacts the upper surface of the valve seat, wherein the pressure-relief diversion slot is opened on the lower surface of the valve core, and the through slot penetrates through the valve core along the thickness direction of the valve core.

The electric valve of the invention further has the following structural features:

A lug is set under the rotor, and a stopper is further set on the valve seat.

The pressure-relief diversion slot and the through slot are both kidney-shaped slots; the pressure-relief diversion slot is a straight-line slot, and the through slot is an arc slot.

The number of the outlets is one, two or three.

The invention further provides a single-cycle refrigerating system, a dual-cycle refrigerating system and a triple-cycle refrigerating system comprising the above electric valve.

The single-cycle refrigerating system provided with the above electric valve according to the claims includes a compressor, a one-way valve, a condenser, an electric valve, a capillary tube and an evaporator; wherein, the compressor, the one-way valve, the condenser, the electric valve, the capillary tube and the evaporator are connected in turn, one end of the evaporator is connected with the capillary tube, and the other end of the evaporator is connected with the compressor; the electric valve is connected with an exhaust port of the compressor via the pressure relief channel.

The dual-cycle refrigerating system provided with the above electric valve includes a compressor, a one-way valve, a condenser, an electric valve, a capillary tube and an evaporator; wherein, the compressor, the one-way valve, the condenser and the electric valve are connected in turn; the capillary tube includes a first capillary tube and a second capillary tube, and the evaporator includes a first evaporator and a second evaporator; the electric valve is connected with the first evaporator via the first capillary tube, and the electric valve is connected with the second evaporator via the second capillary tube; one end of the first evaporator is connected with the first capillary tube, and the other end of the first evaporator is connected with the second evaporator; one end of the second capillary tube is connected with the electric valve, and the second end of the second capillary tube is connected between the first evaporator and the second evaporator; the second evaporator is connected with the compressor; the electric valve is connected with the exhaust port of the compressor via the pressure relief tube.

The triple-cycle refrigerating system provided with the above electric valve includes a compressor, a one-way valve, a condenser, an electric valve, a capillary tube and an evaporator; wherein, the compressor, the one-way valve, the condenser and the electric valve are connected in turn; the capillary tube includes a first capillary tube, a second capillary tube and a third capillary tube, and the evaporator includes a first evaporator, a second evaporator and a third evaporator; the electric valve is connected with the first evaporator via the first capillary tube, and the electric valve is connected with the second evaporator via the second capillary tube, the electric valve is connected with the third evaporator via the third capillary tube; one end of the first evaporator is connected with the first capillary tube, and the other end of the first evaporator is connected with the third evaporator; one end of the second evaporator is connected with the second capillary tube, and the other end of the second evaporator is connected with the third evaporator; one end of the third capillary tube is connected with the electric valve, and the other end of the third capillary tube is connected between the first evaporator and the third evaporator; the third evaporator is connected with the compressor; the electric valve is connected with an exhaust port of the compressor via the pressure relief channel.

In comparison with the prior art, the invention has the following beneficial effects:

For the electric valve of the invention, the functions of a refrigerator, for example, refrigerant bifurcation, cutoff and pressure relief, etc., may be realized by rotating the valve core of the electric valve to different positions, so that the high-pressure hot-state refrigerant in the condenser cannot enter the evaporator after the compressor is shut down, and the potential energy in the high-pressure refrigerant may be kept, thereby the energy dissipation in the refrigerating system may be effectively reduced, and the object of energy saving may be attained; by using the pressure relief loop inside the valve core of the electric valve, fast close can be instantaneously realized for the one-way valve at the time the compressor is shut down, the energy saving effect and the stability of the refrigerating system can be improved, and it has the features of low noise and high stability. The valve core of the electric valve is driven to rotate via a step motor, thus the noise defect of the existing bistable solenoid valve during a reversing process may be overcome, and it has an advantage of low noise.

The electric valve of the invention and the refrigerating system comprising the same have the advantages that the energy dissipation in the refrigerating system may be effectively reduced, the noise is low and the stability of the refrigerating system may be improved.

REFERENCE NUMBERS IN FIG. 1-FIG. 35

1 Compressor; 2 One-Way Valve; 3 Condenser; 4 Electric Valve; 41 Valve Seat; 411 Inlet; 412 Pressure Relief Port; 413 Outlet; 42 Electric Motor; 421 Stator; 422 Rotor; 4221

Mandrel; 43 Valve Cap; 44 Valve Core; 441 Diversion Slot; 442 Through Slot; 5 Capillary Tube; 51 First Capillary Tube; 52 Second Capillary Tube; 53 Third Capillary Tube; 6 Evaporator; 61 First Evaporator; 62 Second Evaporator; 63 Third Evaporator; 7 Pressure Relief Channel; 8 Liquid Feeding Pipe; 9 Liquid Discharging Pipe; 10 Pressure Relief Tube; 11 Power Interface.

The invention will be further illustrated below by the embodiments in conjunction with the drawings.

DETAILED DESCRIPTION OF THE EMBODIMENTS

Referring to FIG. 1-FIG. 35, an electric valve includes a valve seat 41, an electric motor 42 and a valve cap 43; an inlet 411, a pressure relief port 412 and a plurality of outlets 413 are set on the valve seat 41, wherein the pressure relief port 412 and the outlets 413 are located on the upper surface of the valve seat 41; the valve cap 43 is covered above the valve seat 41; the electric motor 42 is fixedly set on the valve cap 43, and the electric motor 42 includes a stator 421 and a rotor 422, wherein the stator 421 is set on the outer surface of the valve cap 43, and the rotor 422 is set in the intracavity of the valve cap 43; the central part of the rotor 422 is provided with a mandrel 4221, and the rotor 422 may rotate around the axis of the mandrel 4221; the lower end of the mandrel 4221 is fixedly provided with a valve core 44 that is opened with a pressure-relief diversion slot 441 and a through slot 442, and the lower surface of the valve core 44 contacts the upper surface of the valve seat 41, the pressure-relief diversion slot 441 is opened on the lower surface of the valve core 44, and the through slot 442 penetrates through the valve core 44 along the thickness direction of the valve core 44.

An external power interface 11 is further set on the stator of the electric motor of the electric valve, and the electric motor of the electric valve is powered by an external power source. The electric motor is a step motor. When the valve core 44 rotates, the electric valve 4 may change among a cutoff state, an open state and a pressure relief state.

In the cutoff state, the pressure-relief diversion slot 441 and the through slot 442 of the valve core 44 are not in communication with any one of the outlets 413 of the valve seat 41, and the pressure relief port 412 and the outlets 413 are both blocked by the valve core 44, and the inlet 411 is not in communication with any one of the outlets 413 or the pressure relief port 412.

In the open state, the through slot 442 of the valve core 44 is exactly located above the outlets 413, and the pressure relief port 412 is blocked by the valve core 44, the through slot 442 of the valve core 44 is in communication with the outlets 413 of the valve seat 41, the inlet 411 is in communication with the outlets 413 via the through slot 442 of the valve core 44, and the pressure relief port 412 is not in communication with the outlets 413 or the inlet 411.

In the pressure relief state, the pressure-relief diversion slot 441 of the valve core 44 is exactly located above the outlets 413 and the pressure relief port 412, and the through slot 442 is blocked by the valve seat 41, the pressure-relief diversion slot 441 of the valve core 44 is in communication with both the outlets 413 and the pressure relief port 412 of the valve seat. Because the pressure-relief diversion slot 441 is located on the lower surface of the valve core 44 and does not penetrate through the valve core 44, the pressure-relief diversion slot 441 only internally communicate the pressure relief port 412 and the outlets 413, thus the inlet 411 is not in communication with any one of the outlets 413 or the pressure relief port 412.

Figure 1:
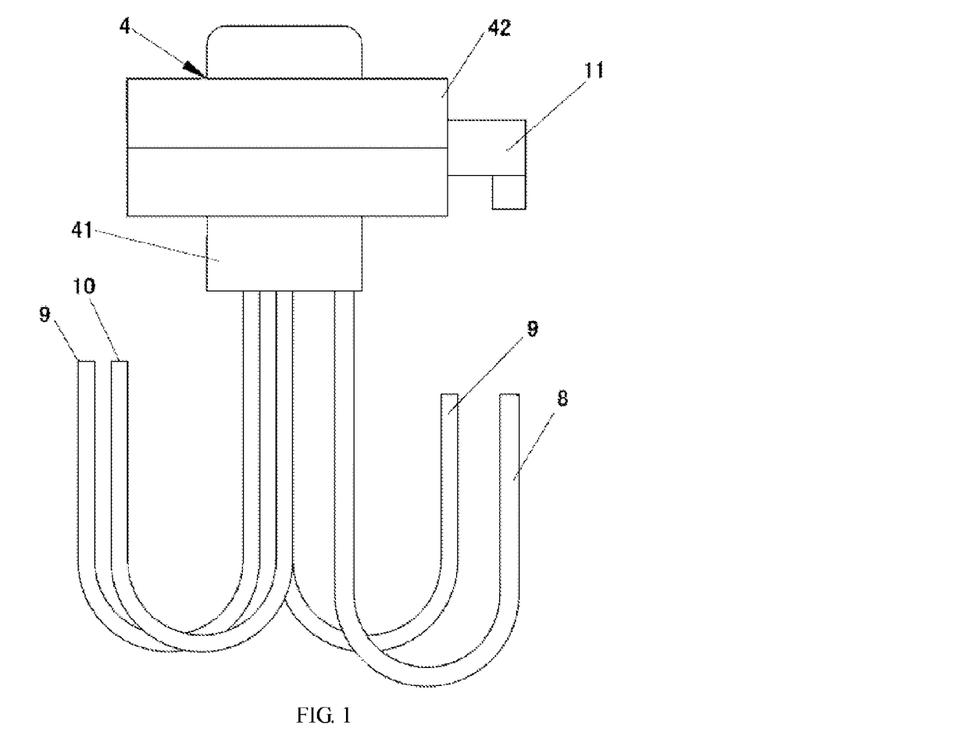
FIG. 1 is a front view of an electric valve according to the invention.
Figure 2:
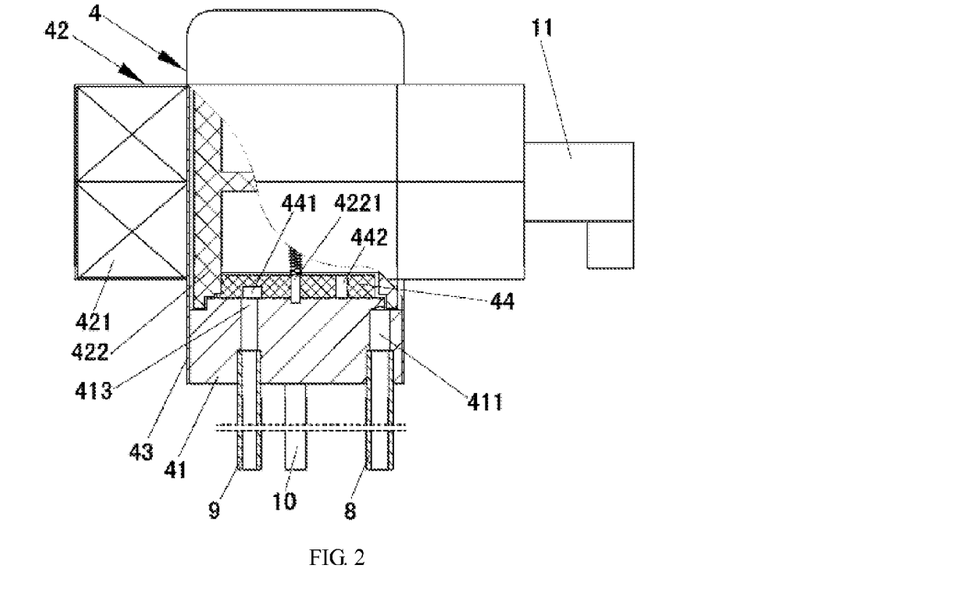
FIG. 2 is a sectional view of an electric valve according to the invention.
Figure 3:
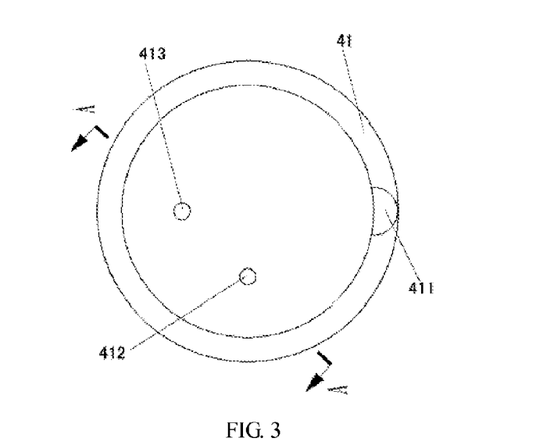
FIG. 3 is a front view of a valve seat (one outlet) of an electric valve according to the invention.
Figure 4:
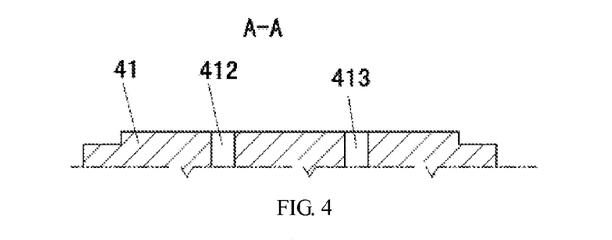
FIG. 4 is a sectional view along line A-A of FIG. 3.
Figure 5:
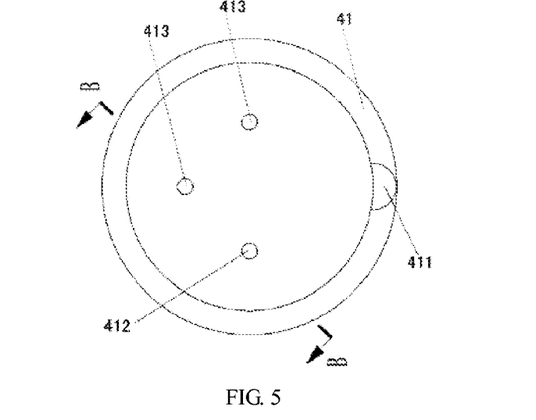
FIG. 5 is a front view of a valve seat (two outlets) of an electric valve according to the invention.
Figure 6:
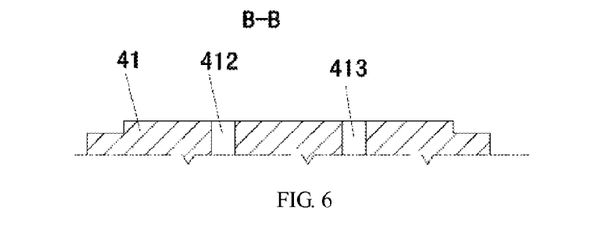
FIG. 6 is a sectional view along line B-B of FIG. 5.
Figure 7:
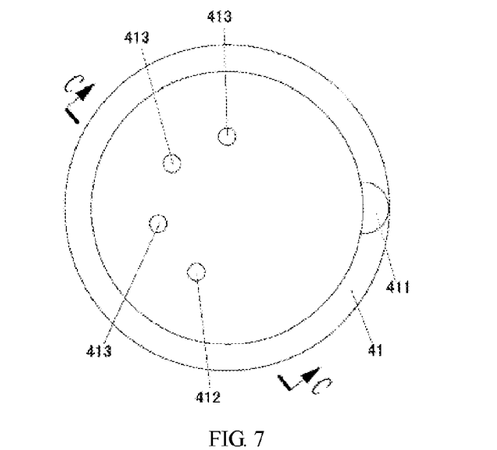
FIG. 7 is a front view of a valve seat (three outlets) of an electric valve according to the invention.
Figure 8:
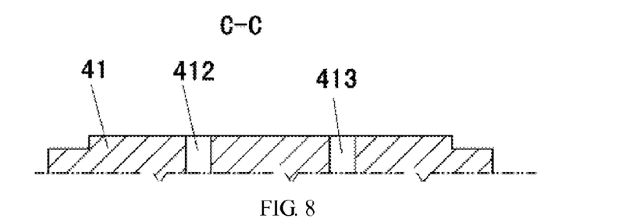
FIG. 8 is a sectional view along line C-C of FIG. 7.
Figure 9:
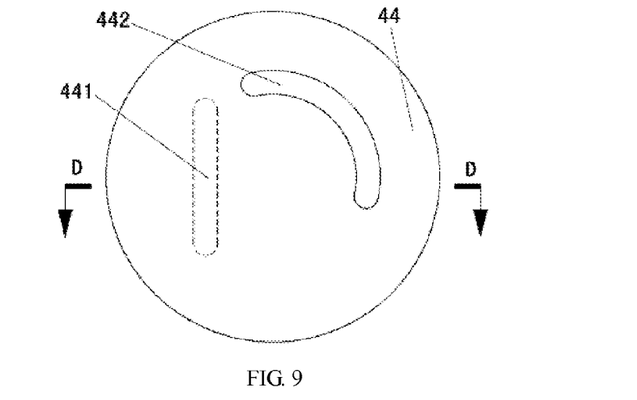
FIG. 9 is a front view of a valve core (when the valve seat has one outlet and two outlets) of an electric valve according to the invention.
Figure 10:
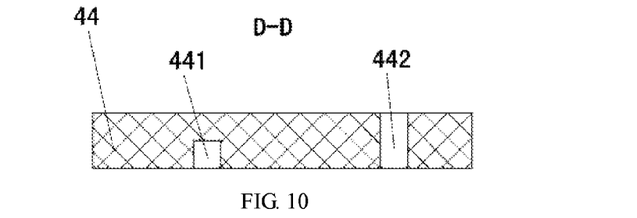
FIG. 10 is a sectional view along line D-D of FIG. 9.
Figure 11:
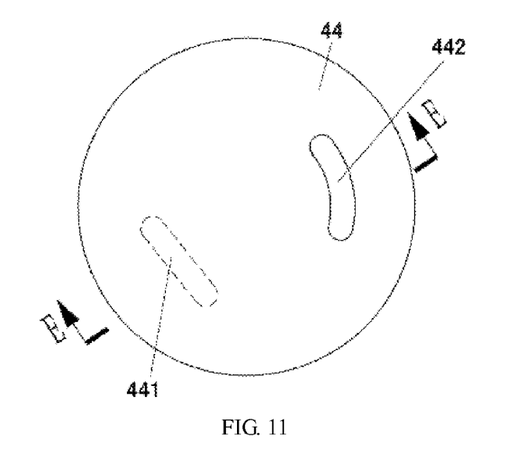
FIG. 11 is a front view of a valve core (when the valve seat has three outlets) of an electric valve according to the invention.
Figure 12:
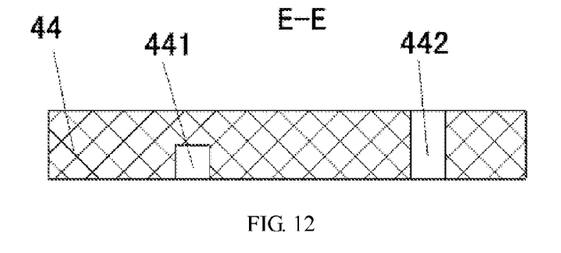
FIG. 12 is a sectional view along line E-E of FIG. 11.
Figure 13:
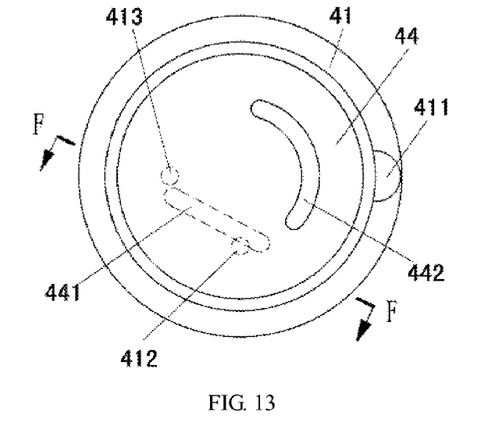
FIG. 13 is a state diagram when a valve seat (one outlet) and a valve core of an electric valve according to the invention are fitted in a cutoff state.
Figure 14:
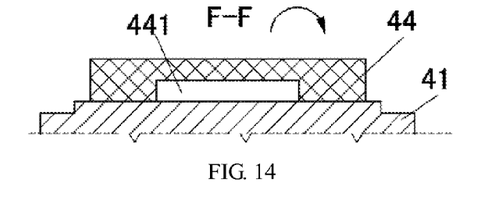
FIG. 14 is a sectional view along line F-F of FIG. 13.
Figure 15:
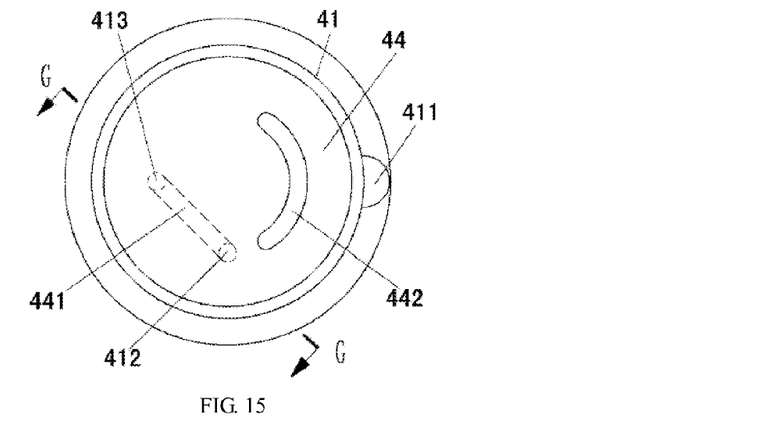
FIG. 15 is a state diagram when a valve seat (one outlet) and a valve core of an electric valve according to the invention are fitted in a pressure relief state.
Figure 16:
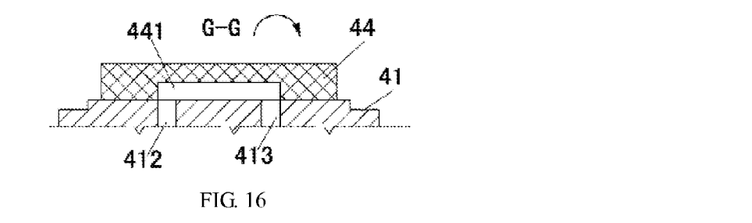
FIG. 16 is a sectional view along line G-G of FIG. 15.
Figure 17:
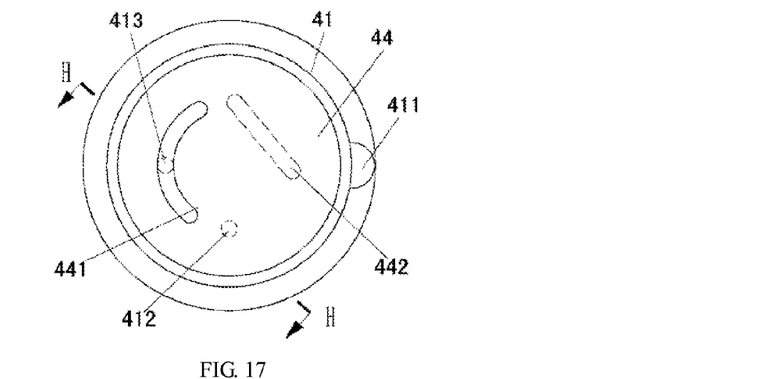
FIG. 17 is a state diagram when a valve seat (one outlet) and a valve core of an electric valve according to the invention are fitted in an open state.
Figure 18:
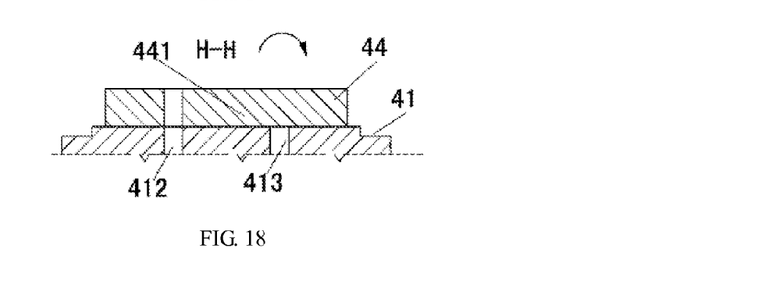
FIG. 18 is a sectional view along line H-H of FIG. 17.
Figure 19:
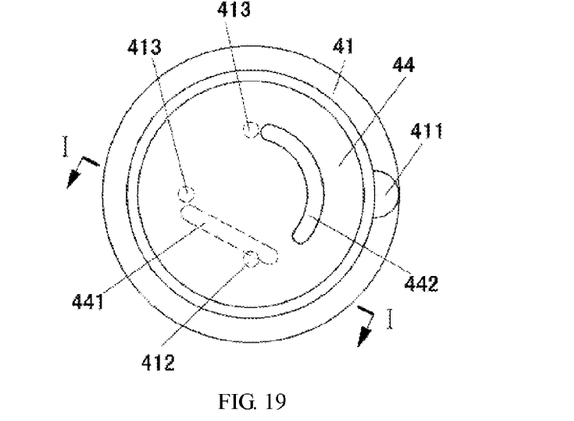
FIG. 19 is a state diagram when a valve seat (two outlets) and a valve core an electric valve according to the invention are fitted in a cutoff state.
Figure 20:
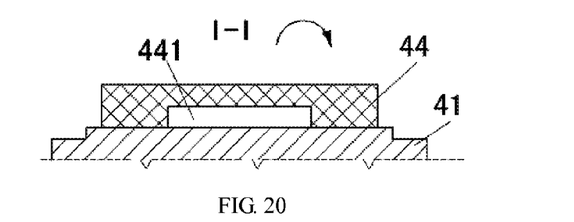
FIG. 20 is a sectional view along line I-I of FIG. 19.
Figure 21:
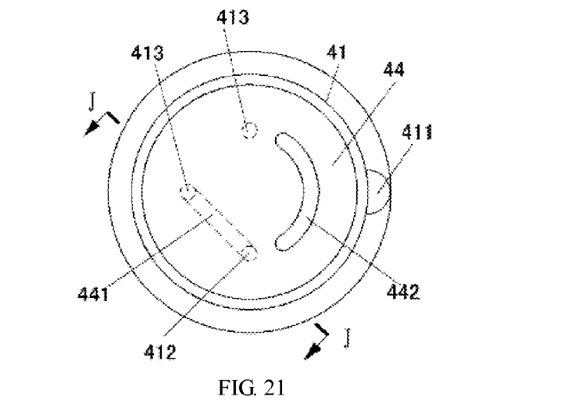
FIG. 21 is a state diagram when a valve seat (two outlets) and a valve core an electric valve according to the invention are fitted in a pressure relief state.
Figure 22:
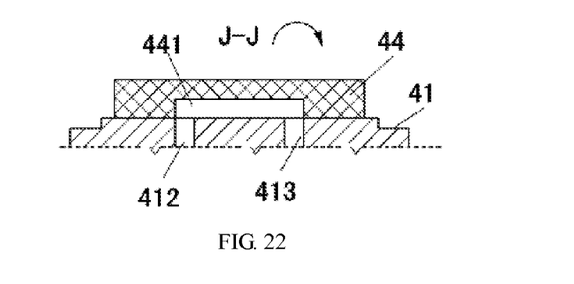
FIG. 22 is a sectional view along line J-J of FIG. 21.
Figure 23:
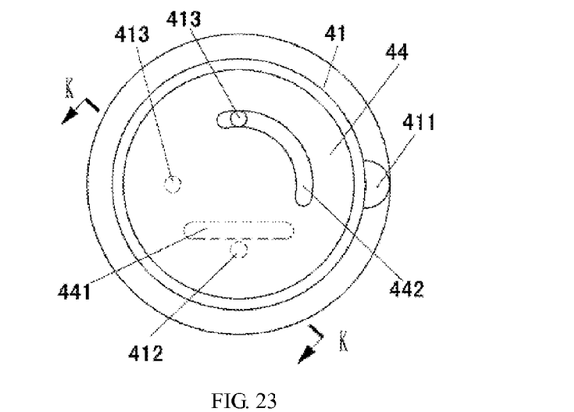
FIG. 23 is a state diagram when a valve seat (two outlets) and a valve core an electric valve according to the invention are fitted in an open state.
Figure 24:
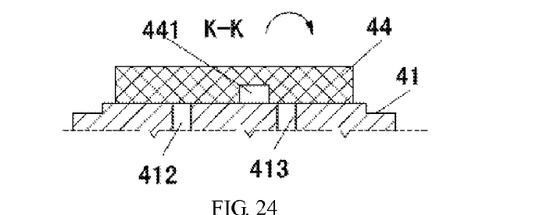
FIG. 24 is a sectional view along line K-K of FIG. 23.
Figure 25:
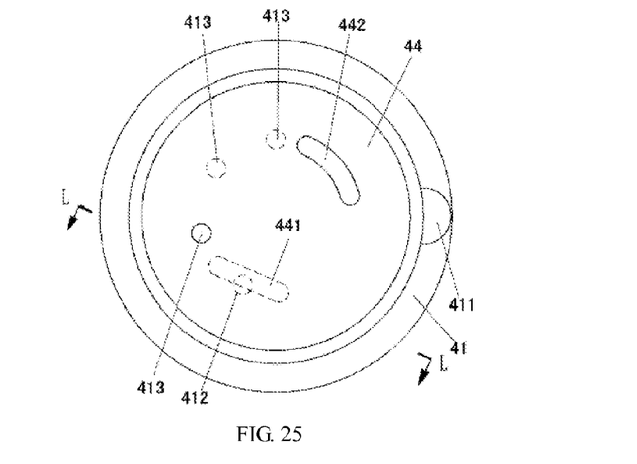
FIG. 25 is a state diagram when a valve seat (three outlets) and a valve core of an electric valve according to the invention are fitted in a cutoff state.
Figure 26:
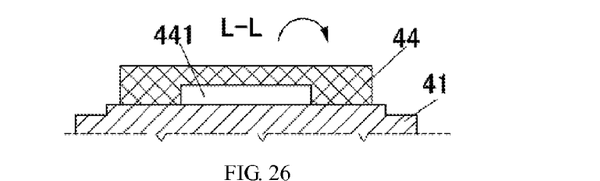
FIG. 26 is a sectional view along line L-L of FIG. 25.
Figure 27:
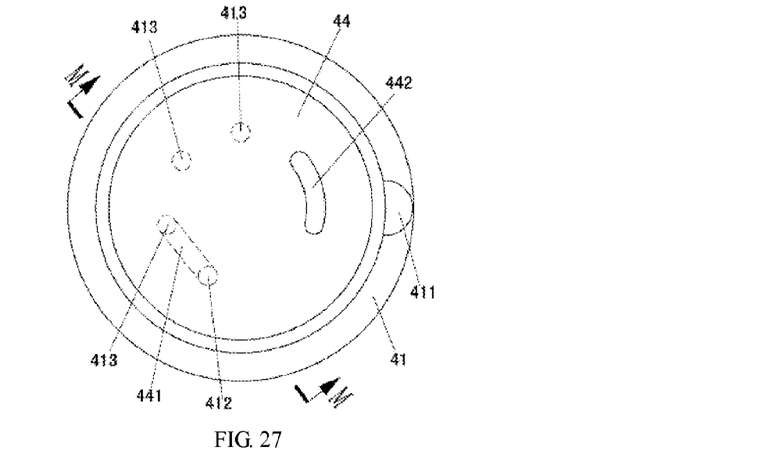
FIG. 27 is a state diagram when a valve seat (three outlets) and a valve core of an electric valve according to the invention are fitted in a pressure relief state.
Figure 28:
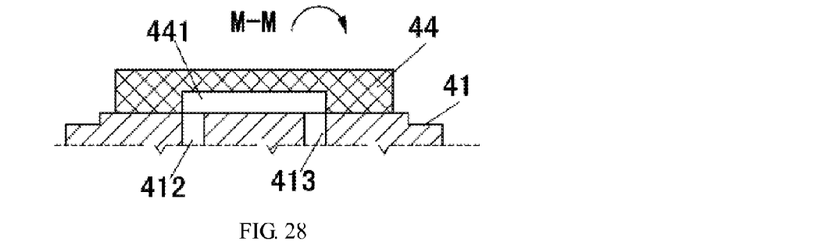
FIG. 28 is a sectional view along line M-M of FIG. 27.
Figure 29:
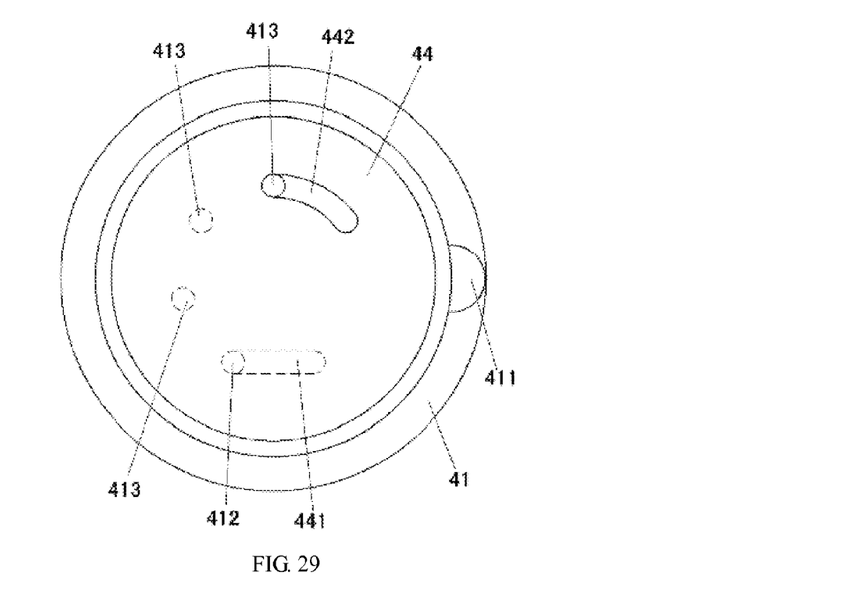
FIG. 29 is a state diagram when a valve seat (three outlets) and a valve core of an electric valve according to the invention are fitted in an open state 1.
Figure 30:
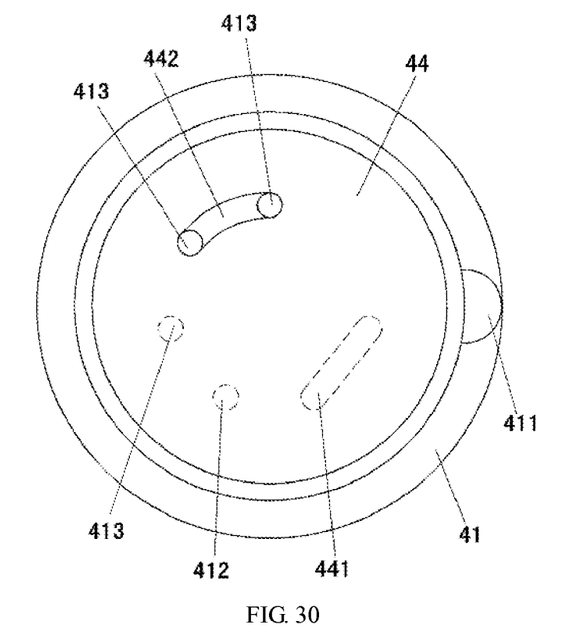
FIG. 30 is a state diagram when a valve seat (three outlets) and a valve core of an electric valve according to the invention are fitted in an open state 2.
Figure 31:
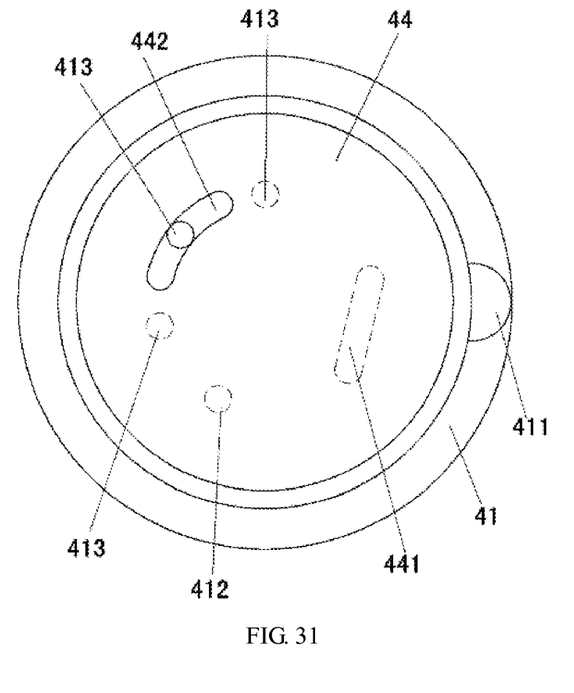
FIG. 31 is a state diagram when a valve seat (three outlets) and a valve core of an electric valve according to the invention are fitted in an open state 3.
Figure 32:
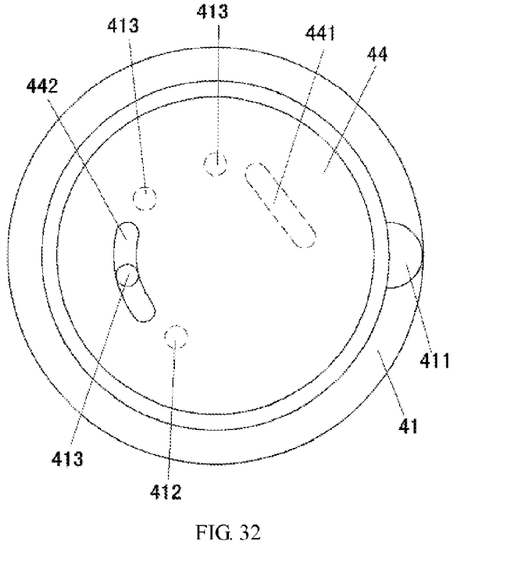
FIG. 32 is a state diagram when a valve seat (three outlets) and a valve core of an electric valve according to the invention are fitted in an open state 4.
Figure 33:
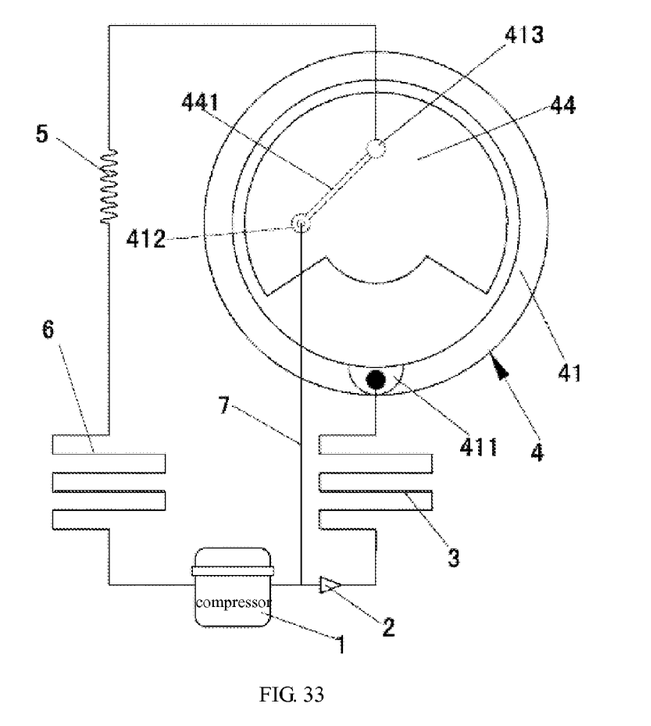
FIG. 33 is a pressure relief state diagram of a single-cycle refrigerating system according to the invention.
Figure 34:
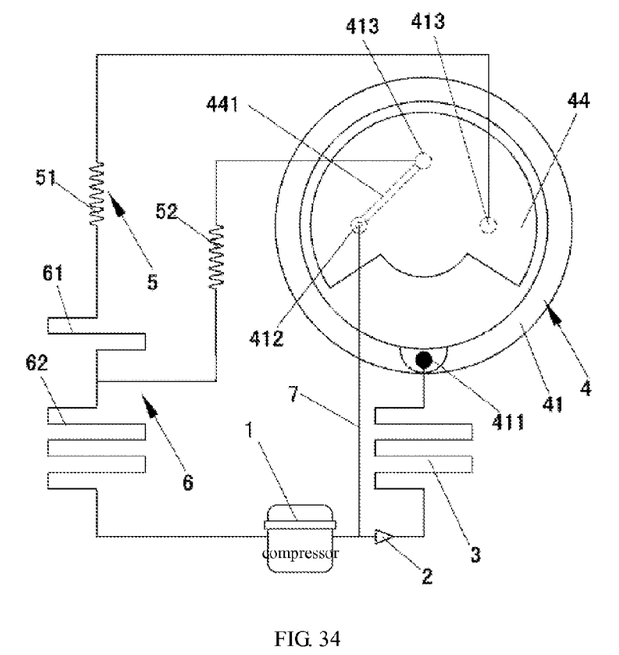
FIG. 34 is a pressure relief state diagram of a dual-cycle refrigerating system according to the invention.
Figure 35:
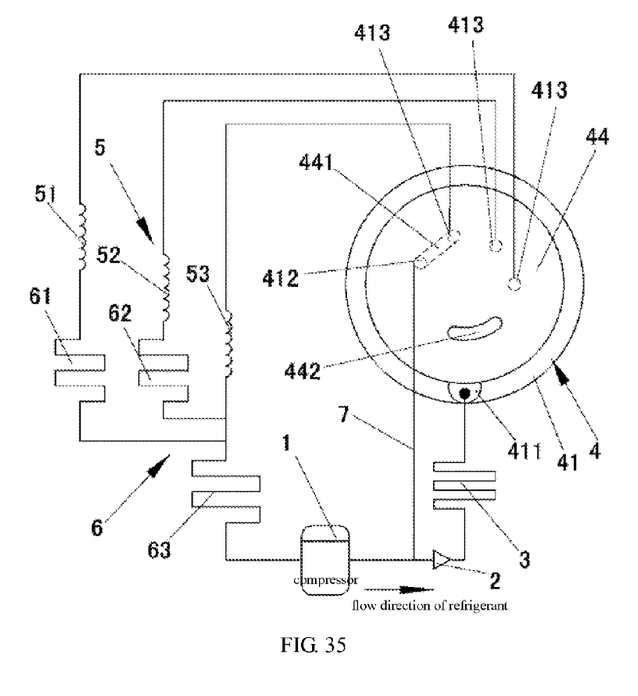
FIG. 35 is a pressure relief state diagram of a triple-cycle refrigerating system according to the invention.

A refrigerating system includes a compressor, a one-way valve, a condenser, an electric valve, a capillary tube and an evaporator, wherein the compressor, the one-way valve, the condenser, the electric valve, the capillary tube and the evaporator are connected in turn in the form of a ring, thereby forming a circulating refrigerating system. A pressure relief port of the valve seat of the electric valve is connected between the compressor and the one-way valve via the pressure relief tube, and when the electric valve is in a pressure relief state, a small amount of high-pressure gas from the exhaust port of the compressor to the one-way valve can flow to the low-pressure evaporator.

The valve seat is a echelon-form cylinder, wherein the diameter of the lower cylinder is larger than that of the upper cylinder; the lower cylinder is the seat body, and the upper cylinder is a cylindrical table set concentrically with the lower cylinder; the pressure relief port and the outlets are set on the top surface of the cylindrical table. The inlet is set on the common boundary of the cylindrical table and the valve seat, i.e., the intersection part of the two. The rotor is of a tubular form, and during assembling, the cylindrical table is exactly located in the intracavity of the rotor. At the same time, a blind hole is set at the center of the cylindrical table, so that the lower end of the mandrel will be inserted into the blind hole. The rotor of the electric motor may drive the mandrel and the valve core to rotate together.

The lower surface of the valve core contacts the upper surface of the cylindrical table, so that the valve core can exactly cover the pressure relief port and the outlets of the valve seat. Because the valve core is provided with a depressed pressure-relief diversion slot and a depressed through slot, the pressure relief port and the outlets can be made in communication with the pressure-relief diversion slot or the through slot by adjusting the position of the valve core. By controlling the rotation angle and rotation direction of the step motor, the electric valve may change among the above three states.

When the valve core turns to different positions by rotating at different angles, the communication state between the pressure relief port, the outlets and the pressure-relief diversion slot, the through slot will be changed. Because the inlet is located at the boundary of the cylindrical table and the valve seat, the refrigerant may enter from the inlet into the valve cavity enclosed by the valve cap and the valve seat. When the through slot on the valve core is in communication with the outlets on the valve seat, that is, when the electric valve is in the open state, the refrigerant in the condenser may flow out from the outlets, thereby realizing the circulation of the refrigerant in the refrigerating system.

When the valve core of the electric valve is in the initial position, the valve core will block both the pressure relief port and the outlets, and the refrigerant in the condenser cannot enter the outlets, and the electric valve will be in a closed state, i.e., the above cutoff state, and at this time, the refrigerant in the condenser cannot be circulated.

Then, by rotating the rotor and the valve core via the step motor, the pressure relief port and the outlets of the valve seat are both in communication with the pressure-relief diversion slot of the valve core, and the through slot is blocked, thus the high-pressure gas in the exhaust port of the compressor passes through the pressure relief tube, the pressure relief port, the outlets and the capillary tube in turn and thus flows to the low-pressure evaporator; at this time, the refrigerating system will be in the pressure relief state. A small amount of refrigerant between the exhaust pipe of the compressor and the one-way valve may flow to the low-pressure evaporator via the pressure relief loop, and one-way valve "responds" rapidly to realizing closing. On one hand, after the compressor is shut down, the high-temperature and high-pressure refrigerant in the condenser cannot pass through the electric valve and flow into the low-pressure and low-temperature evaporator; on the other hand, the high-pressure potential energy of the refrigerant in the condenser is maintained, and when the compressor is started again, it can refrigerate rapidly, thus the energy dissipation during the starting and stopping process of the compressor may be avoided.

Then, the valve core is continuously rotated, and when the valve core is rotated to a position where the through slot is in communication with the outlets, that is, when the electric valve is in the open state, the refrigerant in the valve cavity can flow out from the outlets, so that the refrigerant can flow from the condenser to the capillary tube and the evaporator. At the same time, the pressure relief port will be blocked by the valve core, so that the refrigerant can only flow to the capillary tube and the evaporator by the condenser.

The lower end of the valve seat is connected with a plurality of pipelines that are in communication with the inlet, the pressure relief port and the outlets, i.e., a liquid feeding pipe 8, a pressure relief tube 10 and a liquid discharging pipe 9, respectively; wherein, the number of the outlets may be one or more, and correspondingly, the number of the liquid discharging pipes 9 may also be one or more. The liquid feeding pipe 8, the pressure relief tube 10 and the liquid discharging pipe 9 are fixedly connected with an interface at the lower end of the valve seat and are in communication with the inlet, the pressure relief port and the outlets on the valve seat via the corresponding channels in the valve seat. The refrigerant enters into the electric valve via the liquid feeding pipe and enters into the cavity enclosed by the rotor and the valve seat. The liquid feeding pipe is connected with the condenser, and the liquid discharging pipe is connected with the capillary tube. When the inlet is made in communication with the outlets by the through slot, the liquid feeding pipe will be in communication with the liquid discharging pipe, and the refrigerant may enter from the condenser into the capillary tube and the evaporator via the electric valve.

In the single-cycle refrigerating system, there exists only one outlet and one liquid discharging pipe. In the dual-cycle refrigerating system, there exist two outlets and two liquid discharging pipes. In the triple-cycle refrigerating system, there exist three outlets and three liquid discharging pipes. The liquid discharging pipe is connected with the capillary tube via a pipeline, thus the refrigerant is output to the capillary tube and the evaporator.

In the electric valve of the invention, the functions of a refrigerator, for example, refrigerant bifurcation, cutoff and pressure relief, etc., may be realized by rotating the valve core of the electric valve to different positions, so that the high-pressure hot-state refrigerant in the condenser cannot enter into the evaporator after the compressor is shut down, and the potential energy in the high-pressure refrigerant may be kept, thereby the energy dissipation in the refrigerating system may be effectively reduced, and the object of energy saving may be attained; by using the pressure relief loop inside the valve core of the electric valve, fast close can be realized for the one-way valve at the moment the compressor is shut down, the energy saving effect and the stability of the refrigerating system can be improved, and it has the features of low noise and high stability. The valve core of the electric valve is driven to rotate via a step motor, thus the noise defect of the existing bistable solenoid valve during a reversing process may be overcome, and it has an advantage of low noise.

A lug is set under the rotor 422, and a stopper is further set on the valve seat 41. The rotor and the valve seat are positioned up and down, and the rotor is coupled on the valve seat. The rotor is tubular, and the lug is set under the outer wall of the rotor; the tubular wall of the rotor contacts with the edge part of the upper surface of the lower cylinder of the valve seat; a stopper is set at the edge part of the lower cylinder, and it exactly catches the lug. When the rotor rotates to a certain angle, the lug under the rotor will be exactly blocked by the convex stopper on the valve seat, thereby the rotation angle of the rotor will be restricted.

A pressure-relief diversion slot and a through slot are designed on the valve core, and a pressure relief port and an outlet are designed on the valve seat. When the valve core of the electric valve rotates to the pressure relief state, the pressure relief port and the outlet on the valve seat of the electric valve are connected via the pressure-relief diversion slot inside the valve core, and the refrigerant in the pressure relief port may enter into the outlet via the pressure-relief diversion slot. When the electric rotary valve is in the cutoff state, the pressure relief port, the outlet and the inlet will be blocked by the valve core, and the electric valve will be in a completely closed state.

A "pressure relief loop" consisted of a pressure relief tube and a pressure relief port, which helps the compressor to start, is designed inside the valve core of the electric valve, thus the response capability of the one-way valve may be improved, the reliability of reverse closing may be improved, and the stability of the energy saving effect of the refrigerator may be improved. As a result, a plurality of functions, for example, refrigerant bifurcation, pressure maintaining and pressure relief, may be realized by one rotary valve.

The pressure-relief diversion slot 441 and the through slot 442 are both kidney slots; the pressure-relief diversion slot 441 is a straight-line slot, and the through slot 442 is an arc slot. The pressure-relief diversion slot extends in a straight line along the surface of the valve core, that is, the two lateral surfaces of the kidney slot are both flat surfaces, except for the hemicycle shapes at the two ends thereof. The through slot extends along the arc line of the valve core, i.e., the two lateral surfaces of the through slot are both arc surfaces, except for the hemicycle shapes at the two ends thereof. Because the through slot has an arc surface and the centers of the two outlets are located one the same circumference, the through slot can cover the two outlets at the same time.

The number of the outlets 413 may be one, two or three, which may be adjusted according to the type of the refrigerating system.

A single-cycle refrigerating system provided with the above electric valve includes a compressor 1, a one-way valve 2, a condenser 3, an electric valve 4, a capillary tube 5 and an evaporator 6; wherein, the compressor 1, the one-way valve 2, the condenser 3, the electric valve 4, the capillary tube 5 and the evaporator 6 are connected in turn, one end of the evaporator 6 is connected with the capillary tube 5, and the other end of the evaporator 6 is connected with the compressor 1; the electric valve 4 is connected with an exhaust port of the compressor 1 via the pressure relief channel 7.

In the single-cycle refrigerating system, the electric valve is adjusted to the open state as the compressor is started, and the electric valve is adjusted to the pressure relief state or the cutoff state in the stage that the compressor is stopped. A pressure-relief diversion slot and a through slot are designed on the valve core, and a pressure relief port and an outlet are designed on the valve seat. The electric valve is provided with at least one outlet, preferably, one outlet; a liquid discharging pipe 9 is installed at the outlet. When the valve core of the electric valve rotates to the pressure relief state, the pressure relief port and the outlet on the valve seat of the electric valve are connected via the pressure-relief diversion slot inside the valve core, and the refrigerant in the pressure relief port may enter the outlet via the pressure-relief diversion slot. When the electric rotary valve is in the cutoff state, the pressure relief port, the outlet and the inlet will be blocked by the valve core, and the electric valve will be in a completely closed state. A "pressure relief loop" consisted of a pressure relief tube and a pressure relief port, which helps the compressor to start, is designed inside the valve core of the electric valve, thus the response capability of the one-way valve may be improved, the reliability of reverse closing may be improved, and the stability of the energy saving effect of the refrigerator may be improved. As a result, a plurality of functions, for example, refrigerant bifurcation, pressure maintaining and pressure relief, may be realized by one rotary valve.

A dual-cycle refrigerating system provided with the electric valve includes a compressor 1, a one-way valve 2, a condenser 3, an electric valve 4, a capillary tube 5 and an evaporator 6; wherein, the compressor 1, the one-way valve 2, the condenser 3 and the electric valve 4 are connected in turn; the capillary tube 5 includes a first capillary tube 51 and a second capillary tube 52, and the evaporator 6 includes a first evaporator 61 and a second evaporator 62; the electric valve 4 is connected with the first evaporator 61 via the first capillary tube 51, and the electric valve is connected with the second evaporator 62 via the second capillary tube 52; one end of the first evaporator 61 is connected with the first capillary tube 51, and the other end of the first evaporator 61 is connected with the second evaporator 62; one end of the second capillary tube 52 is connected with the electric valve 4, and the second end of the second capillary tube 52 is connected between the first evaporator 61 and the second evaporator 62; the second evaporator 62 is connected with the compressor 1; the electric valve 4 is connected with an exhaust port of the compressor 1 via the pressure relief tube 7. In the dual-cycle refrigerating system, the electric valve is adjusted to the open state as the compressor is started, and the electric valve is adjusted to the pressure relief state or the cutoff state in the stage that the compressor is stopped. A pressure-relief diversion slot and a through slot are designed on the valve core, and a pressure relief port and an outlet are designed on the valve seat. The electric valve is provided with at least two outlets, preferably, two outlets; the two outlets correspond to two liquid discharging pipes 9 respectively. When the valve core of the electric valve rotates to the pressure relief state, the pressure relief port and the outlets on the valve seat of the electric valve are connected via the pressure-relief diversion slot inside the valve core, and the refrigerant in the pressure relief port may enter into the outlets via the pressure-relief diversion slot. When the electric rotary valve is in the cutoff state, the pressure relief port, the outlets and the inlet will be blocked by the valve core, and the electric valve will be in a completely closed state. A "pressure relief loop" consisted of a pressure relief tube and a pressure relief port, which helps the compressor to start, is designed inside the valve core of the electric valve, thus the response capability of the one-way valve may be improved, the reliability of reverse closing may be improved, and the stability of the energy saving effect of the refrigerator may be improved. As a result, a plurality of functions, for example, refrigerant bifurcation, pressure maintaining and pressure relief, may be realized by one rotary valve.

A triple-cycle refrigerating system provided with the above electric valve includes a compressor 1, a one-way valve 2, a condenser 3, an electric valve 4, a capillary tube 5 and an evaporator 6; wherein, the compressor 1, the one-way valve 2, the condenser 3 and the electric valve 4 are connected in turn; the capillary tube 5 includes a first capillary tube 51, a second capillary tube 52 and a third capillary tube 53, and the evaporator 6 includes a first evaporator 61, a second evaporator 62 and a third evaporator 63; the electric valve 4 is connected with the first evaporator 61 via the first capillary tube 51, the electric valve 4 is connected with the second evaporator 62 via the second capillary tube 52, and the electric valve 4 is connected with the third evaporator 63 via the third capillary tube 53; one end of the first evaporator 61 is connected with the first capillary tube 51, and the other end of the first evaporator 61 is connected with the third evaporator 63; one end of the second evaporator 62 is connected with the second capillary tube 52, and the other end of the second evaporator 62 is connected with the third evaporator 63; one end of the third capillary tube 53 is connected with the electric valve 4, and the other end of the third capillary tube 53 is connected between the first evaporator 61 and the third evaporator 63; the third evaporator 63 is connected with the compressor 1; the electric valve 4 is connected with an exhaust port of the compressor 1 via the pressure relief channel 7.

In the triple-cycle refrigerating system, the electric valve is adjusted to the open state as the compressor is started, and the electric valve is adjusted to the pressure relief state or the cutoff state in the stage that the compressor is stopped. The first evaporator 61, the second evaporator 62 and the third evaporator 63 are respectively a cold preservation evaporator, a temperature changing evaporator and a freezing evaporator. The first evaporator, the second evaporator and the third capillary tube are connected on the same end of the third evaporator. The first evaporator and the first capillary tube form a first branch, the second evaporator and the second capillary tube form a second branch, and the third capillary tube forms a third branch, wherein the first branch, the second branch and the third branch are connected in parallel to form a parallel structure, one end of the parallel structure is connected with the electric valve, and the other end thereof is connected with the third evaporator; that is, the parallel structure is connected in series between the electric valve and the third evaporator. The electric valve is provided with at least three outlets, preferably, three outlets; the three outlets correspond to three liquid discharging pipes 9 respectively; the three liquid discharging pipes are connected with three capillary tubes respectively, for outputting the refrigerant to the three evaporators respectively. The refrigerant from the first outlet and the second outlet passes through the first evaporator and the second evaporator, and then enters into the third evaporator. A pressure relief loop is formed by the pressure relief port and the pressure relief channel of the electric valve, thus the response capability of the one-way valve may be improved, the reliability of reverse closing may be improved, and the stability of the energy saving effect of the refrigerator may be improved. As a result, a plurality of functions, for example, refrigerant bifurcation, pressure maintaining and pressure relief, may be realized by one rotary valve.

What is claimed is:

1. An electric valve, comprising a valve seat, an electric motor and a valve cap; an inlet, a pressure relief port and a plurality of outlets are set on the valve seat, wherein the pressure relief port and the outlets are located on the upper surface of the valve seat; the valve cap is covered above the valve seat; is fixedly set on the valve cap, and the electric motor includes a stator and a rotor, wherein the stator is set on the outer surface of the valve cap, and the rotor is set in the intracavity of the valve cap; the central part of the rotor is provided with a mandrel, and the rotor may rotate around the axis of the mandrel; the lower end of the mandrel is fixedly provided with a valve core that is opened with a pressure-relief diversion slot and a through slot, and the lower surface of the valve core contacts the upper surface of the valve seat, the pressure-relief diversion slot is opened on the lower surface of the valve core, and the through slot penetrates through the valve core along the thickness direction of the valve core;

when the valve core is rotated, the electric valve may change among a cutoff state, an open state and a pressure relief state;

in the cutoff state, the pressure-relief diversion slot and the through slot of the valve core are not in communication with any one of the outlets of the valve seat, the pressure relief port and the outlets are both blocked by the valve core, and the inlet is not in communication with any one of the outlets or the pressure relief port;

in the open state, the through slot of the valve core is exactly located above the outlets, and the pressure relief port is blocked by the valve core, the through slot of the valve core is in communication with the outlets of the valve seat, the inlet is in communication with the outlets via the through slot of the valve core, and the pressure relief port and the outlet are not in communication with the inlet;

in the pressure relief state, the pressure-relief diversion slot of the valve core is exactly located above the outlets and the pressure relief port, and the through slot is blocked by the valve seat, the pressure-relief diversion slot of the valve core and the outlets of the valve seat are both in communication with the pressure relief port, and because the pressure-relief diversion slot is located on the lower surface of the valve core and does not penetrate through the valve core, the pressure-relief diversion slot only communicates the pressure relief port and the outlets internally, thus the inlet is not in communication with any one of the outlets or the pressure relief port.

2. The electric valve according to claim 1, wherein, a lug is set under the rotor, and a stopper is further set on the valve seat.

3. The electric valve according to claim 1, wherein, the pressure-relief diversion slot and the through slot are both kidney slots; the pressure-relief diversion slot is a straight-line slot, and the through slot is an arc slot.

4. The electric valve according to claim 1, wherein, the number of the outlets is one.

5. The electric valve according to claim 1, wherein, the number of the outlets is two.

6. The electric valve according to claim 1, wherein, the number of the outlets is three.

7. A refrigerating system, comprising: a compressor, a one-way valve, a condenser, an electric valve, a capillary tube and an evaporator;

wherein the compressor, the one-way valve, the condenser, the electric valve, and the evaporator are connected in turn, one end of the evaporator is connected with the capillary tube, and the other end of the evaporator is connected with the compressor;

wherein the electric valve is connected with an exhaust port of the compressor via a pressure relief channel and is adjusted to the open state as the compressor is started, and the electric valve is adjusted to the pressure relief state or the cutoff state in the stage that the compressor is stopped;

wherein the electric valve comprises a valve seat, an electric motor and a valve cap; an inlet, a pressure relief port and a plurality of outlets are set on the valve seat, wherein the pressure relief port and the outlets are located on the upper surface of the valve seat; the valve cap is covered above the valve seat; the electric motor is fixedly set on the valve cap; and the electric motor includes a stator and a rotor, wherein the stator is set on the outer surface of the valve cap, and the rotor is set in the intracavity of the valve cap; the central part of the rotor is provided with a mandrel, and the rotor may rotate around the axis of the mandrel; the lower end of the mandrel is fixedly provided with a valve core that is opened with a pressure-relief diversion slot and a through slot, and the lower surface of the valve core contacts the upper surface of the valve seat, the pressure-relief diversion slot is opened on the lower surface of the valve core, and the through slot penetrates through the valve core along the thickness direction of the valve core;

when the valve core is rotated, the electric valve may change among a cutoff state, an open state and a pressure relief state;

in the cutoff state, the pressure-relief diversion slot of the valve core are not in communication with any one of the outlets of the valve seat, the pressure relief port and the outlets are both blocked by the valve core, and the inlet is not in communication with any one of the outlets or the pressure relief port;

in the open state, the through slot of the valve core is exactly located above the outlets, and the pressure relief port is blocked by the valve core, the through slot of the valve core is in communication with the outlets of the valve seat, the inlet is in communication with the outlets via the through slot of the valve core, and the pressure relief port and the outlet are not in communication with the inlet; and, in the pressure relief state, the pressure-relief diversion slot of the valve core is exactly located above the outlets and the pressure relief port, and the through slot is blocked by the valve seat, the pressure-relief diversion slot of the valve core and the outlets of the valve seat are both in communication with the pressure relief port, and because the pressure-relief diversion slot is located on the lower surface of the valve core and does not penetrate through the valve core, the pressure-relief diversion slot only communicates the pressure relief port and the outlets internally, thus the inlet is not in communication with any one of the outlets or the pressure relief port.

8. The refrigerating system according to claim 7, comprising a dual-cycle refrigeration system and the capillary tube comprises a first capillary tube and a second capillary tube, and the evaporator comprises a first evaporator and a second evaporator; the electric valve is connected with the first evaporator via the first capillary tube, and the electric valve is connected with the second evaporator via the second capillary tube; one end of the first evaporator is connected with the first capillary tube and the other end of the first evaporator is connected with the second evaporator; one end of the second capillary tube is connected with the electric valve, and the second end of the second capillary tube is connected between the first evaporator and the second evaporator; the second evaporator is connected with the second evaporator; the electric valve is connected with an exhaust port of the compressor via a pressure relief channel.

9. The refrigerating system according to claim 8, wherein a lug is set under the rotor, and a stopper is further set on the valve seat.

10. The refrigeration system according to claim 8, wherein the pressure-relief diversion slot and the through slot are both kidney slots; the pressure-relief diversion slot is a straight-line slot, and the through slot is an arc slot.

11. The refrigeration system according to claim 8, wherein the number of the outlets is two.

12. The refrigerating system according to claim 7, comprising a triple-cycle refrigeration system and the capillary tube comprises a first capillary tub, a second capillary tube and a third capillary tube, and the evaporator comprises a first evaporator, a second evaporator and a third evaporator; the electric valve is connected with the first evaporator via the first capillary tube, the electric valve is connected with the second evaporator via the second capillary tube, and the electric valve is connected with the third evaporators via the third capillary tube; one end of the first evaporator is connected with the first capillary tube, and the other end of the first evaporator is connected with the third evaporator; one end of the second evaporator is connected with the second capillary tube, and the other end of the second evaporator is connected with the third evaporator; one end of the third capillary tube is connected with the electric valve, and the other end of the third capillary tube is connected between the first evaporator and the third evaporator; the third evaporator is connected with the compressor; the electric valve is connected with an exhaust port of the compressor via a pressure relief channel.

13. The refrigerating system according to claim 12, wherein a lug is set under the rotor, and a stopper is further set on the valve seat.

14. The refrigeration system according to claim 12, wherein the pressure-relief diversion slot and the through slot are both kidney slots; the pressure-relief diversion slot is a straight-line slot, and the through slot is an arc slot.

15. The refrigeration system according to claim 12, wherein the number of the outlets is three.

16. The refrigerating system according to claim 7, comprising a single-cycle refrigeration system and wherein a lug is set under the rotor, and a stopper is further set on the valve seat.

17. The refrigeration system according to claim 7, wherein the pressure-relief diversion slot and the through slot are both kidney slots; the pressure-relief diversion slot is a straight-line slot, and the through slot is an arc slot.

18. The refrigeration system according to claim 7, wherein the number of the outlets is one.

* * * * *